United States Patent
Conners et al.

(10) Patent No.: US 9,542,367 B2
(45) Date of Patent: Jan. 10, 2017

(54) PROGRAMMATIC SELF-LEARNING OF INTER-SYSTEM DOCUMENT PROCESSING CONFIGURATIONS

(71) Applicant: International Business Machines Corporation, Armonk, NY (US)

(72) Inventors: Michael R. Conners, Hilliard, OH (US); Fredrick W. Fahrenback, Valrico, FL (US); Stephanie A. Fetzer, Wilmington, NC (US); Michael J. Hudson, Delray Beach, FL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 80 days.

(21) Appl. No.: 14/696,118

(22) Filed: Apr. 24, 2015

(65) Prior Publication Data
US 2016/0314098 A1    Oct. 27, 2016

(51) Int. Cl.
*G06F 17/00* (2006.01)
*G06F 17/22* (2006.01)

(52) U.S. Cl.
CPC ....... *G06F 17/2241* (2013.01); *G06F 17/2247* (2013.01)

(58) Field of Classification Search
CPC .................. G06F 17/2247; G06F 17/2241
See application file for complete search history.

(56) References Cited

U.S. PATENT DOCUMENTS

| | | | |
|---|---|---|---|
| 5,202,977 A * | 4/1993 | Pasetes, Jr. ......... | G06F 17/2247 341/50 |
| 7,447,707 B2 | 11/2008 | Gaurav et al. | |
| 7,895,362 B2 | 2/2011 | Anderson et al. | |
| 7,984,373 B2 | 7/2011 | Machiraju et al. | |
| 8,156,148 B2 | 4/2012 | Gaurav et al. | |
| 2008/0071806 A1* | 3/2008 | Gaurav ............... | G06F 17/2247 |
| 2008/0168081 A1* | 7/2008 | Gaurav ............... | G06F 17/2247 |

(Continued)

OTHER PUBLICATIONS

Sunil Dandamudi, et al., What is New with IBM WebSphere Transformation Extender (WTX), Impact 2014, Apr. 27-May 1, 2014, pp. 1-44, IBM Corporation, Las Vegas, NV.

*Primary Examiner* — Stephen Hong
*Assistant Examiner* — Marshon Robinson
(74) *Attorney, Agent, or Firm* — Lee Law, PLLC; Christopher B. Lee

(57) ABSTRACT

In response to reception of an electronic data interchange (EDI) instance document, a determination is made that a hierarchical EDI reception processing rule sequence, useable to partition encoded hierarchical envelopes of the EDI instance document and to invoke processing of payload data packaged within the encoded hierarchical envelopes, has not been configured. Through analysis of content of the EDI instance document, an EDI standard and syntax formatting of the encoded hierarchical envelopes that package the payload data within the EDI instance document are determined. An EDI reception processing sequence definition that encodes the hierarchical EDI reception processing rule sequence is configured that is usable to partition the encoded hierarchical envelopes of the EDI instance document and to invoke the processing of the payload data packaged within the encoded hierarchical envelopes.

20 Claims, 6 Drawing Sheets

(56) References Cited

U.S. PATENT DOCUMENTS

| | | | |
|---|---|---|---|
| 2008/0222517 A1* | 9/2008 | Halim | G06F 17/227 715/236 |
| 2009/0132912 A1* | 5/2009 | Sulistio | G06F 17/2247 715/236 |
| 2010/0083084 A1 | 4/2010 | Cicman et al. | |

* cited by examiner

PROGRAMMATIC SELF-LEARNING OF INTER-SYSTEM DOCUMENT PROCESSING CONFIGURATIONS

BACKGROUND

The present invention relates to inter-system document processing configuration. More particularly, the present invention relates to programmatic self-learning of inter-system document processing configurations.

Many different standards exist for formatting data within documents that are used to perform electronic data interchange (EDI). The different standards include, among others, Accredited Standards Committee X12 (ASC X12); United Nations/Electronic Data Interchange for Administration, Commerce, and Transportation (UN/EDIFACT); Health Level 7 (HL7); Society of Worldwide Interbank Financial Telecommunication (SWIFT); and Association for Cooperative Operations Research and Development (ACORD).

BRIEF SUMMARY

A computer-implemented method includes determining, in response to reception of an electronic data interchange (EDI) instance document, that a hierarchical EDI reception processing rule sequence, useable to partition encoded hierarchical envelopes of the EDI instance document and to invoke processing of payload data packaged within the encoded hierarchical envelopes, has not been configured; determining, by analysis of content of the EDI instance document, an EDI standard and syntax formatting of the encoded hierarchical envelopes that package the payload data within the EDI instance document; and configuring an EDI reception processing sequence definition that encodes the hierarchical EDI reception processing rule sequence usable to partition the encoded hierarchical envelopes of the EDI instance document and to invoke the processing of the payload data packaged within the encoded hierarchical envelopes.

A system that performs the method and a computer program product that causes a computer to perform the method are also described.

DETAILED DESCRIPTION

Figure 1:
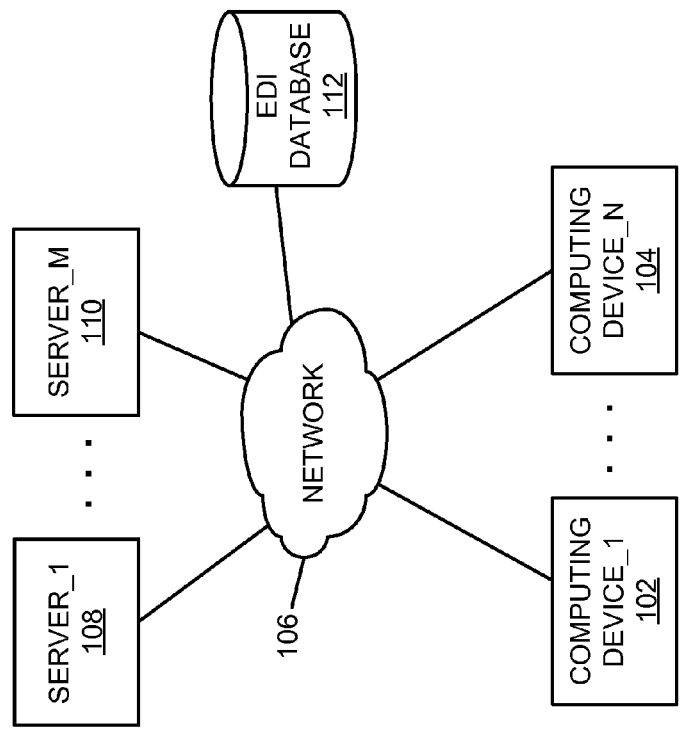
FIG. 1 is a block diagram of an example of an implementation of a system for programmatic self-learning of inter-system document processing configurations according to an embodiment of the present subject matter.

The examples set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The subject matter described herein provides programmatic self-learning of inter-system document processing configurations. The present technology solves a recognized electronic data interchange (EDI) configuration problem by providing technology that includes a new form of computing device that performs self-configuration of computational processing for EDI within complex inter-system computing environments. The present technology improves interoperation among systems that utilize complex and varied standards for inter-system EDI by reducing improper configuration(s) and by improving accuracy of EDI processing. The self-configuration of computational processing for EDI operates by programmatic analysis and processing of example data patterns that comply with a particular EDI format or by programmatic analysis of real instance documents that are received. Through the programmatic analysis and processing of the example data patterns or the real instance documents, the computing device may learn how to process the particular EDI format, and may configure data processing steps to perform real-time processing of future instance documents that are formatted in the particular EDI format as the instance documents are received. As such, the present technology may operate to autonomously configure EDI processing for multiple different present and future EDI standards.

The present subject matter facilitates autonomous configuration of EDI processing by establishing a processing sequence for a received EDI document in accordance with data within the actual EDI document itself. The processing described herein operates by analysis of data fields within hierarchical EDI document wrapper information (alternatively "envelopes" herein) of the received EDI document and identification of one or more appropriate other process identifiers (IDs) that identify processes to be invoked to process payload data of each encoded envelope. Complementary EDI transmission processing (e.g., acknowledgements, or other information exchanges) and EDI document envelope creation and payload packaging may also be configured in accordance with the data in the actual EDI document itself.

As a foundation of understanding for the description that follows, it is presumed that certain values that are encoded within fields of the envelopes are pre-configured and mapped to different processes intended to manage and process the EDI document payload data within the respective envelopes. For example, the term "PAYABLE" may be mapped to an accounts payable department process, and the present technology configures a processing sequence to unpack lower-level EDI envelopes from an EDI document and to invoke the appropriate process within the accounts payable department that is mapped by the "PAYABLE" keyword. As such, the present technology comprehensively configures EDI document processing for each hierarchical envelope contained within a particular EDI document for any transactions that are defined between two information exchanging parties. Configuration of reception processing for an EDI document is considered completed at the time of configuration of the appropriate processing sequence to invoke all of the appropriate other processes that are intended to manage and process the EDI payload data within a received EDI document.

In response to reception of an electronic data interchange (EDI) instance document, the present technology determines that a hierarchical EDI reception processing rule sequence, useable to partition encoded hierarchical envelopes of the EDI instance document and to invoke processing of payload data packaged within the encoded hierarchical envelopes, has not been configured. An EDI standard and syntax formatting of the encoded hierarchical envelopes that package the payload data within the EDI instance document are determined by analysis of content of the EDI instance document. An EDI reception processing sequence definition that encodes the hierarchical EDI reception processing rule sequence usable to partition the encoded hierarchical envelopes of the EDI instance document and to invoke the processing of the payload data packaged within the encoded hierarchical envelopes is configured.

The programmatic self-learning of inter-system document processing configurations provides real-time reception processing sequences for EDI instance documents. Complementary EDI transmission processing sequences for similarly-formatted EDI instance documents may also be autonomously configured based upon the autonomously configured reception processing sequences for the EDI instance documents.

The present technology may operate during either design/configuration time or during runtime (e.g., in real time responsive to receipt of a document of unknown type) to programmatically establish configurations for electronic data interchange of data that conforms to an industry standard format for EDI. The industry standards may include existing EDI standards, such as ASC X12, UN/EDIFACT, HL7, SWIFT, ACORD, and may also include new standards for EDI as those new standards are developed and deployed over time.

For incoming data, the present technology operates to configure a system to determine what to do with a document that has certain structural and data content fields within the document when the document comes into the system. For outgoing data, the present technology operates to determine how to package certain types of data for ultimate consumption by a data recipient before it is sent out of the system, and to configure the system to properly package the data for consumption by the recipient.

Runtime processing for EDI may be performed upon data that is exchanged between systems in accordance with a set of EDI processing rules. The EDI-processing rules may be programmatically determined (e.g., learned) from example data sets or from real instance documents that are received. The EDI processing rules may be pre-configured by pro- cessing of the example data sets, or may be configured in real time (e.g., "just-in-time" configuration) to configure processing of an unexpected document type during runtime.

The EDI processing rules follow a self-teaching pattern of determining the data type/standard in the data, determining the organization represented in the data, determining the organizational meaning or transactional content of the data, and determining the processing steps to process the data according to the determined data type, the determined organization, and the organizational/transactional content.

A process flow of an instance document of EDI data entering a system may include determining the industry standard, if any, based upon the pre-determined standards-identification rules (alternatively termed "EDI configuration universal defaults" herein) so that the system recognizes the format of the incoming data/file. The data is then interrogated to determine a sender (from which the data/file was received) and a recipient (to which the data/file is intended to be delivered), and the organizational/transactional content of the data/file. Once these steps are performed, the appropriate processing for the data/file may be determined and performed.

The terms "document," "EDI document," and "EDI instance document" are used interchangeably herein to refer to received electronically exchanged structured information formatted using an EDI standard. The term "envelope" as used herein refers to processing categories of granularity. An envelope in EDI represents structured data that surrounds a data payload and that provides information useable to route and/or process the data within the data payload. The present technology uses envelopes to allow a system to process data without having to look at the data payload itself. Within more complex data processing environments, multiple levels of envelopes (envelopes containing envelopes) may exist within a given data transmission or reception by a system. A first processing step within a receiving system may, for example, only look at an outer interchange-level envelope, may make processing/routing decisions based upon that "outer wrapping information," and may send the content of the envelope to a next step of processing. The next step of processing may only look at wrapper information of a next nested/inner envelope to determine what to do with the data payload of that inner envelope. Additional processing of increasingly granular/nested envelopes may continue as appropriate for the given implementation.

It should be noted that envelope schemes vary by industry, data standards, and even individually by mutual data trading-partner consent. The envelope schemes used as examples in the present description include ASC X12, where an initial electronic data interchange may include a batch (e.g., set) of messages destined for multiple different departments in an organization (e.g., payroll, claims, accounts payable, etc.). A first processing step may break the initial data interchange into departments by functional group (or department) envelopes (e.g., functional-group level envelopes). Once each department's data envelope is received by the systems that process data for the respective departments, then a particular department's process may break its functional group envelope down into transaction sets (e.g., benefits coverage, enrollment status, etc.) envelopes (e.g., transaction-set level envelopes) within the functional group envelope. Each group of similar transactions, surrounded by a transaction set envelope, may then be sent into processing, where the transaction set envelopes may be removed, and the data payload processed.

With this understanding of EDI envelopes for which processing is programmatically configured by the present technology, additional details of the present technology will be described. As introduced above, the present technology may utilize a combination of sample/example data and globally configurable settings to configure a system to process received EDI data envelopes to develop EDI reception processing rules. The EDI reception processing rules further include rules to process acknowledgements in response to reception/processing of the EDI document. The reception configuration processing may also be utilized to develop EDI transmission processing rules that encapsulate data intended for EDI within the appropriate envelopes. Alternatively, the EDI transmission processing rules may be developed using configured trading partner defaults or universal defaults, and metadata may be constructed for the respective hierarchical layers of envelopes to configure the EDI transmission processing rules.

It should additionally be noted that the EDI reception processing rules and the EDI transmission processing rules may be configured in real time (e.g., "just-in-time" configuration) to respectively configure processing of an unexpected inbound or outbound document type during runtime. As such, example documents or real instance documents may be utilized to develop and configure EDI processing for either inbound or outbound electronic document interchanges.

The developed/created EDI reception processing rules collectively represent an EDI reception processing sequence definition. The sequence of the EDI reception processing rules within the EDI reception processing sequence definition constitute a hierarchical envelope processing sequence usable to process a received electronic data interchange (EDI) instance document by sequentially applying the sequence of EDI reception processing rules.

Similarly, the developed/created EDI transmission processing rules collectively represent an EDI transmission processing sequence definition. The sequence of the EDI transmission processing rules within the EDI transmission processing sequence definition constitute a hierarchical envelope processing sequence usable to process an electronic data interchange (EDI) instance document for transmission by sequentially applying the sequence of EDI transmission processing rules.

It should be noted that conception of the present subject matter resulted from recognition of certain limitations associated with the configuration of systems for EDI. For example, it was observed that EDI standards are complex and that each EDI standard is different with different complexities. It was further observed that prior technologies for processing such data are limited with respect to the type of data that may be processed. It was also observed that organizations are retaining fewer subject matter experts in EDI, and that a typical user does not know where to find configuration data to setup electronic data interchange between systems. As a consequence, properly determining how to configure electronic data interchange is burdensome for users and is error prone because user configurations are subject to errors that may result in improper processing of EDI information for either transmission or upon reception. It was determined from these observations that, in view of the complexity of EDI standards and potential evolution of new EDI standards, in combination with an observed increase in parties that want to utilize EDI standards, new technology that autonomously learns to process data for EDI would provide improved accuracy of runtime processing of data that is interchanged between systems. It was further determined that programmatic self-learning/self-teaching technology may provide scalability to manage established EDI standards within an increasing number of systems, and may also provide scalability to learn and manage new EDI standards as they evolve within an increasing number of data-exchanging systems. The present subject matter improves electronic data interchange by providing for programmatic self-learning of inter-system document processing configurations, as described above and in more detail below. As such, improved electronic data interchange and scalability may be obtained through use of the present technology.

The programmatic self-learning of inter-system document processing configurations described herein may be performed in real time to allow prompt self-learning and configuration of EDI between systems. For purposes of the present description, real time shall include any time frame of sufficiently short duration as to provide reasonable response time for information processing acceptable to a user of the subject matter described. Additionally, the term "real time" shall include what is commonly termed "near real time"-generally meaning any time frame of sufficiently short duration as to provide reasonable response time for on-demand information processing acceptable to a user of the subject matter described (e.g., within a portion of a second or within a few seconds). These terms, while difficult to precisely define are well understood by those skilled in the art.

FIG. 1 is a block diagram of an example of an implementation of a system 100 for programmatic self-learning of inter-system document processing configurations. A computing device_1 102 through a computing device_N 104 communicate via a network 106 with several other devices. The other devices include a server_1 108 through a server_M 110, and an electronic data interchange (EDI) database 112.

The EDI database 112 may store EDI configuration universal defaults for multiple different EDI standards, both existing EDI standards and as new EDI standards as they are developed. The EDI database 112 may also store EDI trading partner configuration defaults.

The EDI configuration universal defaults may include EDI formatting information for each EDI standard, such as standards-based EDI format specifications (e.g., EDI element separation syntax, repeating element delimiters, sub-element delimiters, segment terminators, etc.). From the standards-based EDI format specifications, example documents or runtime encountered instance documents may be parsed to identify which EDI standard of multiple possible EDI standards was used to encode the particular document (for reception configuration), or which EDI standard should be used to encode the instance document for EDI transfer (for transmission configuration). Using EDI reception configuration as an example, a runtime encountered instance document may be parsed to identify which EDI standard was used to encode the envelope information for the particular document. Once the EDI standard is identified, additional processing may be performed to identify a sender, recipient, and other information.

Based upon the particular sender and recipient, the EDI trading partner configuration defaults may be evaluated to determine any additional processing to be configured based upon EDI documents received from the particular sender or EDI documents to be sent to the particular sender. For example, a particular sender may be configured by default to receive functional acknowledgements or application acknowledgements. In either case, additional EDI configurations may be established to create outbound envelopes for wrapping the respective acknowledgements.

As such, the information stored within the EDI database 112 may form a knowledge foundation from which the EDI configuration may be derived for both inbound and outbound EDI processing. The information stored as part of the EDI configuration universal defaults and the EDI trading partner configuration defaults may be any information appropriate for a given implementation. Many possibilities exist for population of these default or customized information stores, and all such possibilities are considered to be within the scope of the present technology. The EDI database 112 may additionally store EDI reception processing rules and EDI transmission processing rules that are configured for processing of EDI data by one or more of the computing device_1 102 through the computing device_N 104 and the server_1 108 through the server_M 110.

As will be described in more detail below in association with FIG. 2 through FIG. 5B, the computing device_1 102 through the computing device_N 104 and the server_1 108 through the server_M 110 may each provide automated programmatic self-learning of inter-system document processing configurations. The automated programmatic self-learning of inter-system document processing configurations is based upon programmatic learning of patterns within data that is received or that is to be transmitted. The automated programmatic self-learning of inter-system document processing configurations described herein configures a given system to understand how to process EDI envelopes within received data or to package data that is to be transmitted within EDI envelopes. The present technology may be implemented at a user computing device or server device level, or by a combination of such devices as appropriate for a given implementation. A variety of possibilities exist for implementation of the present subject matter, and all such possibilities are considered within the scope of the present subject matter.

The network 106 may include any form of interconnection suitable for the intended purpose, including a private or public network such as an intranet or the Internet, respectively, direct inter-module interconnection, dial-up, wireless, or any other interconnection mechanism capable of interconnecting the respective devices.

The computing device_1 102 through the computing device_N 104 each represent a device that may be utilized for EDI. The server_1 108 through the server_M 110 may include any device capable of providing data for consumption by a device, such as the computing device_1 102 through the computing device_N 104, via a network, such as the network 106. As such, the server_1 108 through the server_M 110 may each include a web server, application server, or other data server device utilized for EDI.

The EDI database 112 may include a relational database, an object database, or any other storage type of device. As such, the EDI database 112 may be implemented as appropriate for a given implementation. As described above, the EDI database 112 may store EDI configuration universal defaults, EDI trading partner configuration defaults, and EDI reception processing rules and EDI transmission processing rules that are configured from the respective information for processing of EDI data by one or more of the computing device_1 102 through the computing device_N 104 and the server_1 108 through the server_M 110.

Figure 2:
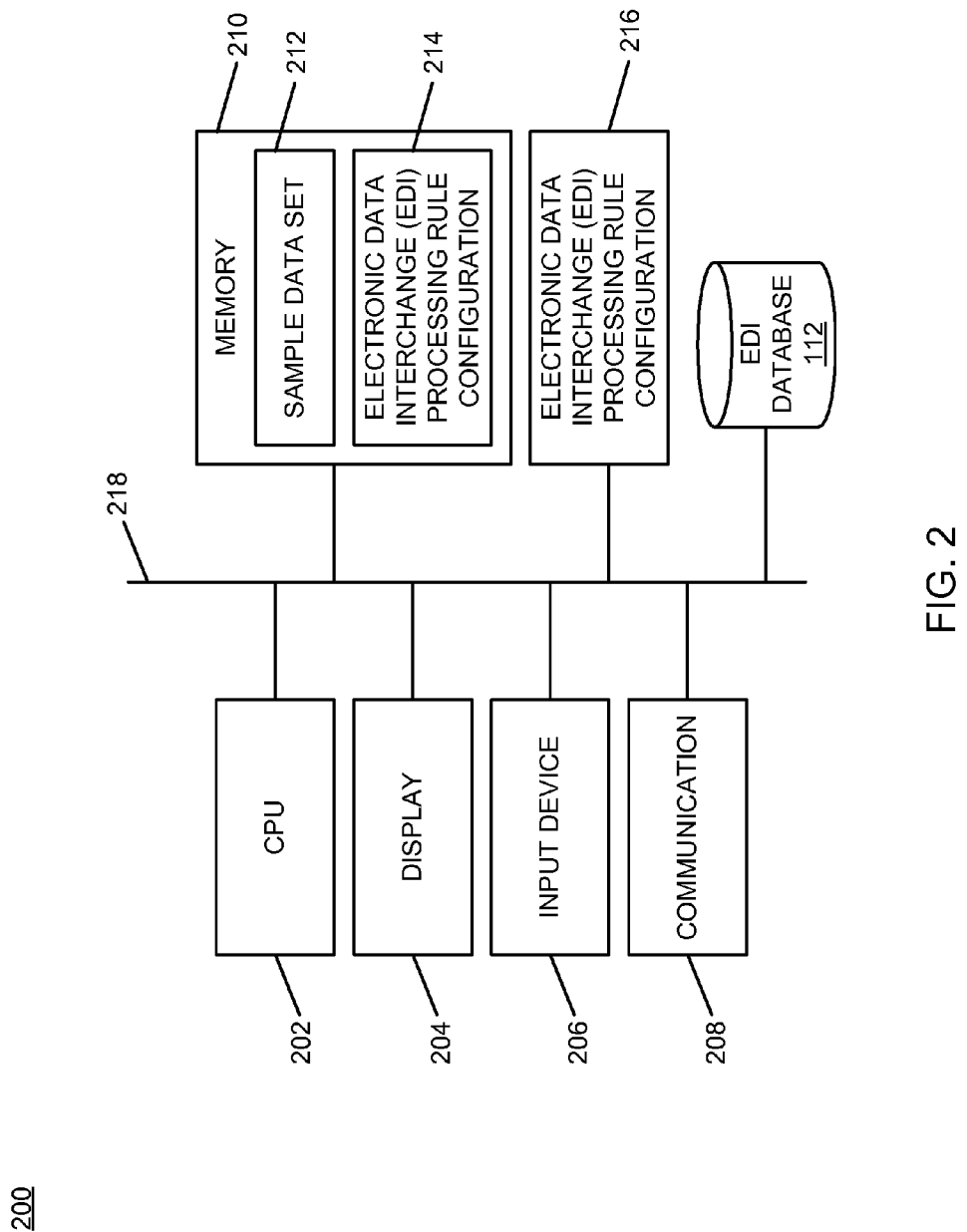
FIG. 2 is a block diagram of an example of an implementation of a core processing module capable of performing programmatic self-learning of inter-system document processing configurations according to an embodiment of the present subject matter.

FIG. 2 is a block diagram of an example of an implementation of a core processing module 200 capable of performing programmatic self-learning of inter-system document processing configurations. The core processing module 200 may be associated with either the computing device_1 102 through the computing device_N 104 or with the server_1 108 through the server_M 110, as appropriate for a given implementation. As such, the core processing module 200 is described generally herein, though it is understood that many variations on implementation of the components within the core processing module 200 are possible and all such variations are within the scope of the present subject matter.

Further, the core processing module 200 may provide different and complementary processing of configuration and utilization of EDI reception processing rules and EDI transmission processing rules in association with each implementation. As such, for any of the examples below, it is understood that any aspect of functionality described with respect to any one device that is described in conjunction with another device (e.g., sends/sending, etc.) is to be understood to concurrently describe the functionality of the other respective device (e.g., receives/receiving, etc.).

A central processing unit (CPU) 202 ("processor") provides hardware that performs computer instruction execution, computation, and other capabilities within the core processing module 200. A display 204 provides visual information to a user of the core processing module 200 and an input device 206 provides input capabilities for the user.

The display 204 may include any display device, such as a cathode ray tube (CRT), liquid crystal display (LCD), light emitting diode (LED), electronic ink displays, projection, touchscreen, or other display element or panel. The input device 206 may include a computer keyboard, a keypad, a mouse, a pen, a joystick, touchscreen, voice command processing unit, or any other type of input device by which the user may interact with and respond to information on the display 204.

It should be noted that the display 204 and the input device 206 may be optional components for the core processing module 200 for certain implementations/devices, or may be located remotely from the respective devices and hosted by another computing device that is in communication with the respective devices. Accordingly, the core processing module 200 may operate as a completely automated embedded device without direct user configurability or feedback. However, the core processing module 200 may also provide user feedback and configurability via the display 204 and the input device 206, respectively, as appropriate for a given implementation.

A communication module 208 provides hardware, protocol stack processing, and interconnection capabilities that allow the core processing module 200 to communicate with other modules within the system 100. The communication module 208 may include any electrical, protocol, and protocol conversion capabilities useable to provide interconnection capabilities, as appropriate for a given implementation. As such, the communication module 208 represents a communication device capable of carrying out communications with other devices.

A memory 210 includes a sample data set storage area 212 that stores example data, such as example envelope data patterns, within the core processing module 200. The memory 210 also includes an electronic data interchange (EDI) processing rule configuration area 214 that provides storage and configuration space for EDI reception processing rules and EDI transmission processing rules.

It is understood that the memory 210 may include any combination of volatile and non-volatile memory suitable for the intended purpose, distributed or localized as appropriate, and may include other memory segments not illustrated within the present example for ease of illustration purposes. For example, the memory 210 may include a code storage area, an operating system storage area, a code execution area, and a data area without departure from the scope of the present subject matter.

An electronic data interchange (EDI) processing rule configuration module 216 is also illustrated. The EDI processing rule configuration module 216 provides computational learning and configuration of EDI reception processing rules and EDI transmission processing rules for the core processing module 200, as described above and in more detail below. The EDI processing rule configuration module 216 implements the automated programmatic self-learning of inter-system document processing configurations of the core processing module 200.

It should also be noted that the EDI processing rule configuration module 216 may form a portion of other circuitry described without departure from the scope of the present subject matter. Further, the EDI processing rule configuration module 216 may alternatively be implemented as an application stored within the memory 210. In such an implementation, the EDI processing rule configuration module 216 may include instructions executed by the CPU 202 for performing the functionality described herein. The CPU 202 may execute these instructions to provide the processing capabilities described above and in more detail below for the core processing module 200. The EDI processing rule configuration module 216 may form a portion of an interrupt service routine (ISR), a portion of an operating system, a portion of a browser application, or a portion of a separate application without departure from the scope of the present subject matter.

The EDI database 112 is again shown within FIG. 2 associated with the core processing module 200. As such, the EDI database 112 may be operatively coupled to the core processing module 200 without use of network connectivity, as appropriate for a given implementation.

The CPU 202, the display 204, the input device 206, the communication module 208, the memory 210, the EDI processing rule configuration module 216, and the database 112 are interconnected via an interconnection 218. The interconnection 218 may include a system bus, a network, or any other interconnection capable of providing the respective components with suitable interconnection for the respective purpose.

Though the different modules illustrated within FIG. 2 are illustrated as component-level modules for ease of illustration and description purposes, it should be noted that these modules may include any hardware, programmed processor(s), and memory used to carry out the functions of the respective modules as described above and in more detail below. For example, the modules may include additional controller circuitry in the form of application specific integrated circuits (ASICs), processors, antennas, and/or discrete integrated circuits and components for performing communication and electrical control activities associated with the respective modules. Additionally, the modules may include interrupt-level, stack-level, and application-level modules as appropriate. Furthermore, the modules may include any memory components used for storage, execution, and data processing for performing processing activities associated with the respective modules. The modules may also form a portion of other circuitry described or may be combined without departure from the scope of the present subject matter.

Additionally, while the core processing module 200 is illustrated with and has certain components described, other modules and components may be associated with the core processing module 200 without departure from the scope of the present subject matter. Additionally, it should be noted that, while the core processing module 200 is described as a single device for ease of illustration purposes, the components within the core processing module 200 may be co-located or distributed and interconnected via a network without departure from the scope of the present subject matter. For a distributed arrangement, the display 204 and the input device 206 may be located at a point of sale device, service provider site, or other location, while the CPU 202 and memory 210 may be located at a local or remote server. Many other possible arrangements for components of the core processing module 200 are possible and all are considered within the scope of the present subject matter. It should also be understood that, though the database 112 is illustrated as a separate component for purposes of example, the information stored within the database 112 may also/alternatively be stored within the memory 210 without departure from the scope of the present subject matter. Accordingly, the core processing module 200 may take many forms and may be associated with many platforms.

Figure 3:
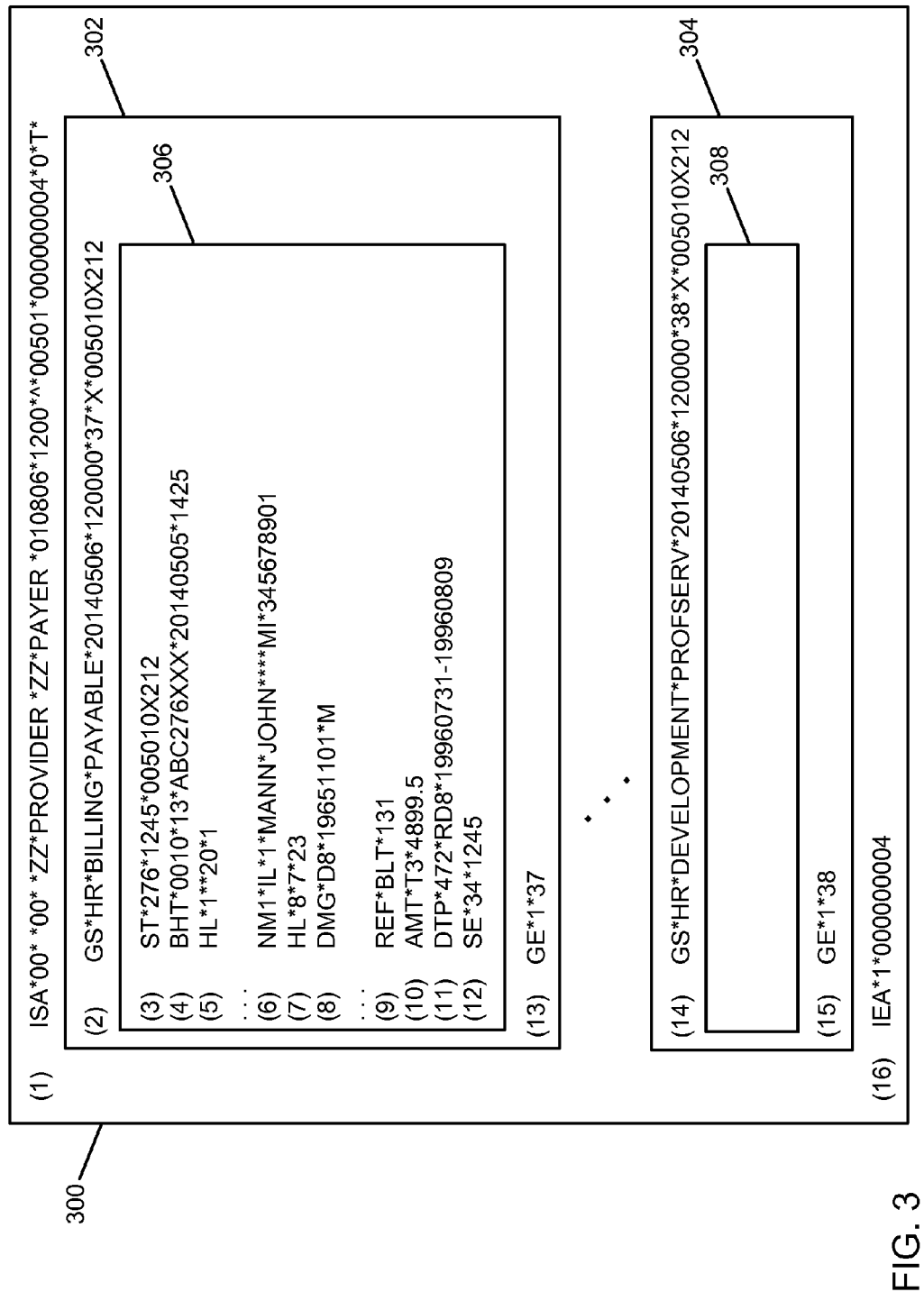
FIG. 3 is a representation of an example electronic data interchange (EDI) document that may be processed by configured EDI reception processing rules and EDI transmission processing rules that result from the programmatic self-learning of inter-system document processing configurations according to an embodiment of the present subject matter.

FIG. 3 is a representation of an example electronic data interchange (EDI) document 300 that may be processed by configured EDI reception processing rules and EDI transmission processing rules that result from the programmatic self-learning of inter-system document processing configurations described herein. The example EDI document 300 is represented with parenthetical line numbering for ease of description, though it is understood that the parenthetical line numbering is not considered part of the example EDI document 300 itself. The parenthetical line numbers will be utilized in the description below to refer to particular parts of the example EDI document 300.

Within the example EDI document 300, envelope data lines (1) and (16) represent an outer interchange-level envelope of the example EDI document 300. As described above, this outer interchange-level envelope may be processed initially upon reception to determine further processing of functional-group level envelopes and transaction-set level envelopes that are encapsulated within the example EDI document 300, as described in more detail below. Alternatively, the outer interchange-level envelope data may be added to encapsulate the respective functional-group level envelopes and transaction-set level envelopes for transmission using EDI.

A functional group envelope 304 and a functional group envelope 306 represent first and last functional-group level envelopes within the example EDI document 300, with ellipsis dots between the respective envelopes to illustrate that additional functional-group level envelopes may be included within the example EDI document 300.

Within the functional group envelope 304, envelope data lines (2) and (13) represent an intermediate envelope that encapsulates a transaction set envelope 306. Similarly, within the functional group envelope 306, envelope data lines (14) and (15) represent an intermediate envelope that encapsulates a transaction set envelope 308. Data within the transaction set envelope 308 is omitted to avoid crowding within the drawing figure, though it is understood that each functional-group level envelope within the example EDI document 300 may include one or more encapsulated transaction-set level envelopes.

Within the functional group envelope 306, envelope data lines (3) through (5) and envelope data lines (9) through (12) represent an internal envelope that encapsulates one or more transactional-set level envelopes (e.g., data sets), as represented by additional sets of ellipsis dots within the functional group envelope 306. To again avoid crowding within the drawing figure, only one transactional data set is illustrated, as represented within envelope data lines (6) through (8).

With this foundational description of the example EDI document 300, details of computer learning to determine how to process the example EDI document 300 upon reception or to determine how to package the example EDI document 300 for transmission will now be described, with additional reference to data represented within the example EDI document 300 in FIG. 3.

As introduced above, the processing tasks of configuration at the document/data level are different for incoming and outgoing data. For incoming data, data analysis may be performed to configure a system to understand what to do with a document that contains certain structural and data content fields when it comes into the system. For outgoing data, data analysis may be performed to determine how to package up certain types of data for ultimate consumption by a data recipient before it is sent out of the system and to configure the system to properly package the data for consumption by the recipient.

The following portion of the present description focuses primarily upon reception of the example EDI document 300. However, it is understood that different processing may be performed to package the example EDI document 300. Information usable to programmatically learn how to package the example EDI document 300 may be obtained in association with a system used to programmatically learn how to unpackage the example EDI document 300.

Within the example EDI document 300, all three of the different forms of envelope levels (e.g., interchange level, functional-group level, and transaction-set level) contain information that may be used to identify processing-related activities for the example EDI document 300 upon receipt. The information contained within the example EDI document 300 includes information such as where the data came from, who will ultimately get the data, and what the system is expected to do with the data upon reception.

Configurable decisions for incoming data may include a determination of whether the system should partition the document into individual transactions or even smaller units of work, whether the system should validate the data in the document against the syntax and semantic requirements of the appropriate EDI standard, whether the system should validate the document against a higher level set of rules (e.g., business rules), whether the system should send any reported validation failures to another party (and if so, in what format and with what tolerances), and/or whether the system should transform this incoming data into another format. Similarly for outgoing data, an example decision may include a determination of whether the system should batch data into groups before sending, how granularly any such batching should be performed, and other determinations. It should be understood that there are many possible configuration options, and programmatic learning of all such configuration options is considered within the scope of the present technology.

To further the example of FIG. 3 and the example EDI document 300, it is noted that the data within the example EDI document 300 represents data based for purposes of example on the ASC X12 envelope definition. For purposes of description, each envelope data line of the example data will be referred to as a "segment," and each segment will be referred to by its respective line number and an associated segment tag (e.g., the letters before the first asterisk (*) of each line). Further, each data element of the respective segment is described with its numeric location after (relative to) the associated segment identifier.

As such, for the segment on transaction-set level envelope line (6), specifically "NM1*IL*1*MANN*JOHN****MI*345678901," reference to "envelope data line (6) NM104," reference is being made to the fourth (04) asterisk-delimited data element after "NM1." As such, within this example, the referenced data value is "JOHN."

With this understanding of references into the example EDI document 300, the configuration task for processing of the example EDI document 300 is to learn and establish EDI reception processing rules and EDI transmission processing rules for the multiple levels of envelopes that define the requirements for selection of a document to process using the respective EDI processing rule. Continuing with the present example, it can be seen from FIG. 3 that "envelope data line (1) ISA04" identifies a sending party "PROVIDER." Similarly, "envelope data line (1) ISA06" identifies a receiving party "PAYER." Additionally, "envelope data line (2) GS02" identifies a sending functional group as "BILLING, and "envelope data line (2) GS03" identifies a receiving functional group as "PAYABLE." Further, "envelope data line (3) ST01" identifies a claims status (ST) request "276."

Based upon this example, an EDI reception processing rule may be configured with these criteria to cause only EDI documents coming from company "PROVIDER" and being sent to company "PAYER," that are also from department "BILLING" to department "PAYABLE," with a data element "276" (e.g., a claim status request), to invoke the respective other process that is intended to manage and process the payload data for these types of data exchanges. It is noted that within this example, the EDI reception processing rule may be configured to evaluate data at multiple levels of envelope hierarchy.

As described above, the present technology provides for programmatic learning and configuration of processing rules for sequential selection and processing (e.g., un-packaging) of individual envelopes at a single envelope level, with additional rules configured for each hierarchical envelope level. However, as described in the present example, the present technology also provides for creation of all three inbound or all three outbound envelope patterns or configurations within the same EDI processing rule.

It should further be noted that EDI may also include a reply to acknowledge the receipt of inbound data from another organization (e.g., with a functional "997" or an application "999" acknowledgement). The present technology also provides for creating configurations for outbound envelopes for wrapping such acknowledgements in association with creating the configurations for the inbound envelope processing.

Figure 4:
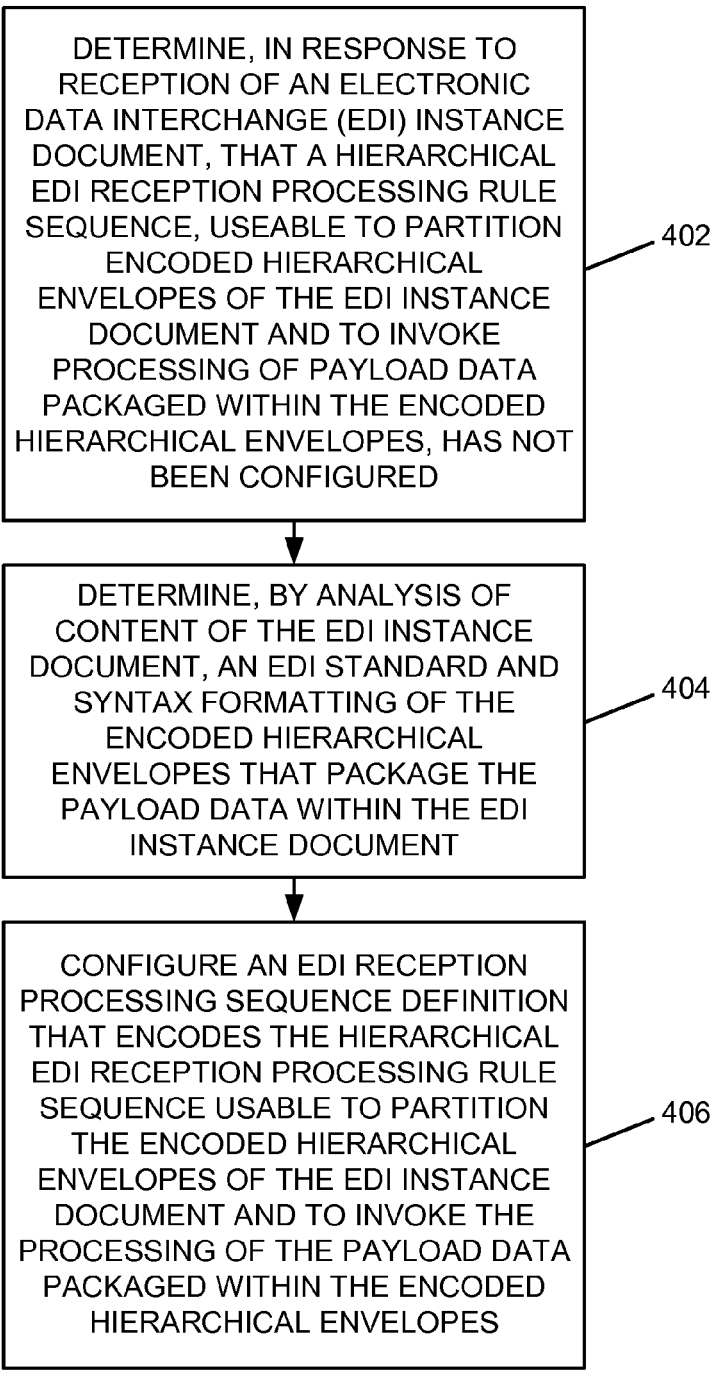
FIG. 4 is a flow chart of an example of an implementation of a process for programmatic self-learning of inter-system document processing configurations according to an embodiment of the present subject matter.
Figure 5A:
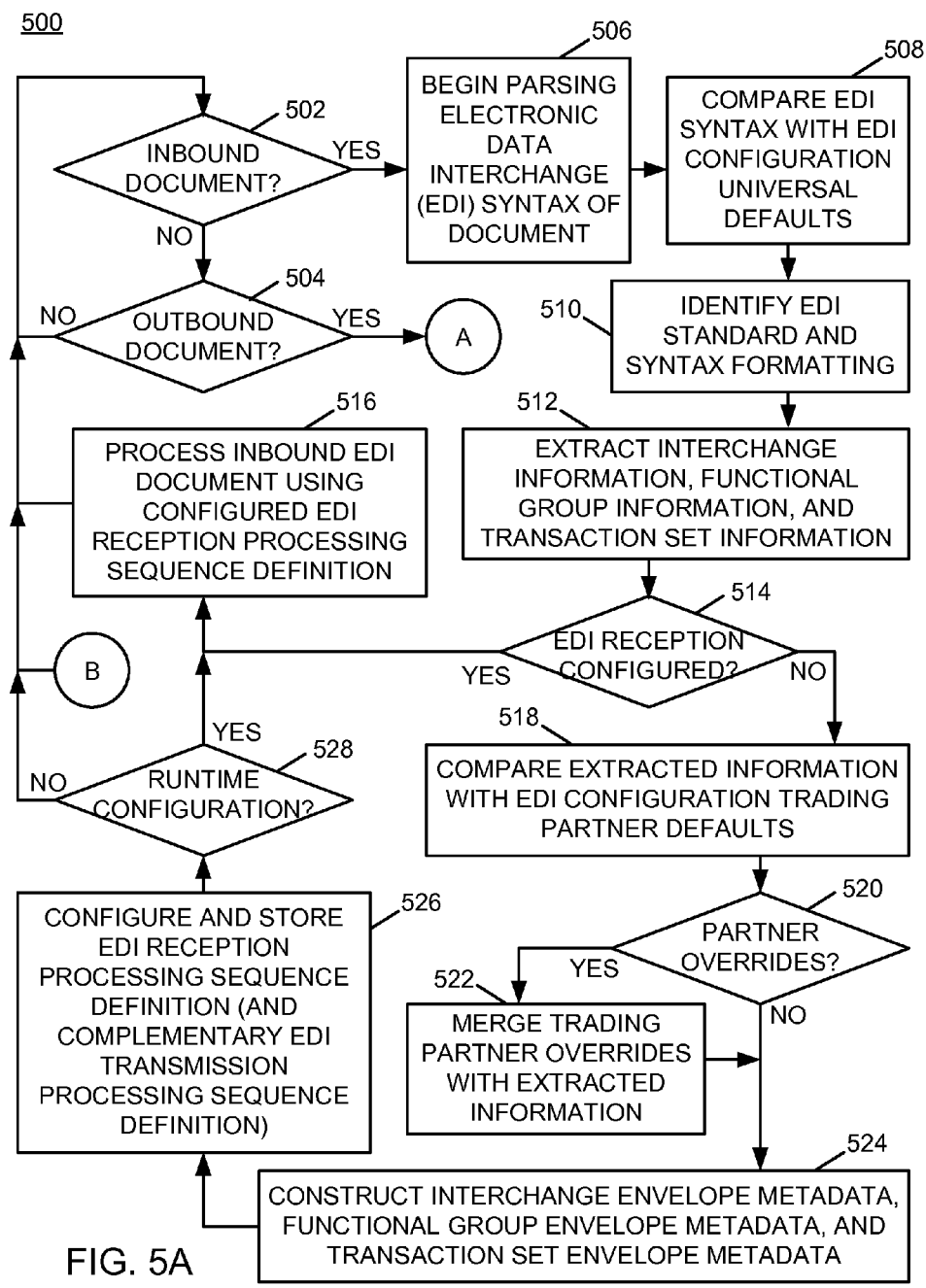
FIG. 5A is a flow chart of an example of an implementation of initial processing within a process for programmatic self-learning of inter-system document processing configurations and runtime processing of EDI documents according to an embodiment of the present subject matter.
Figure 5B:
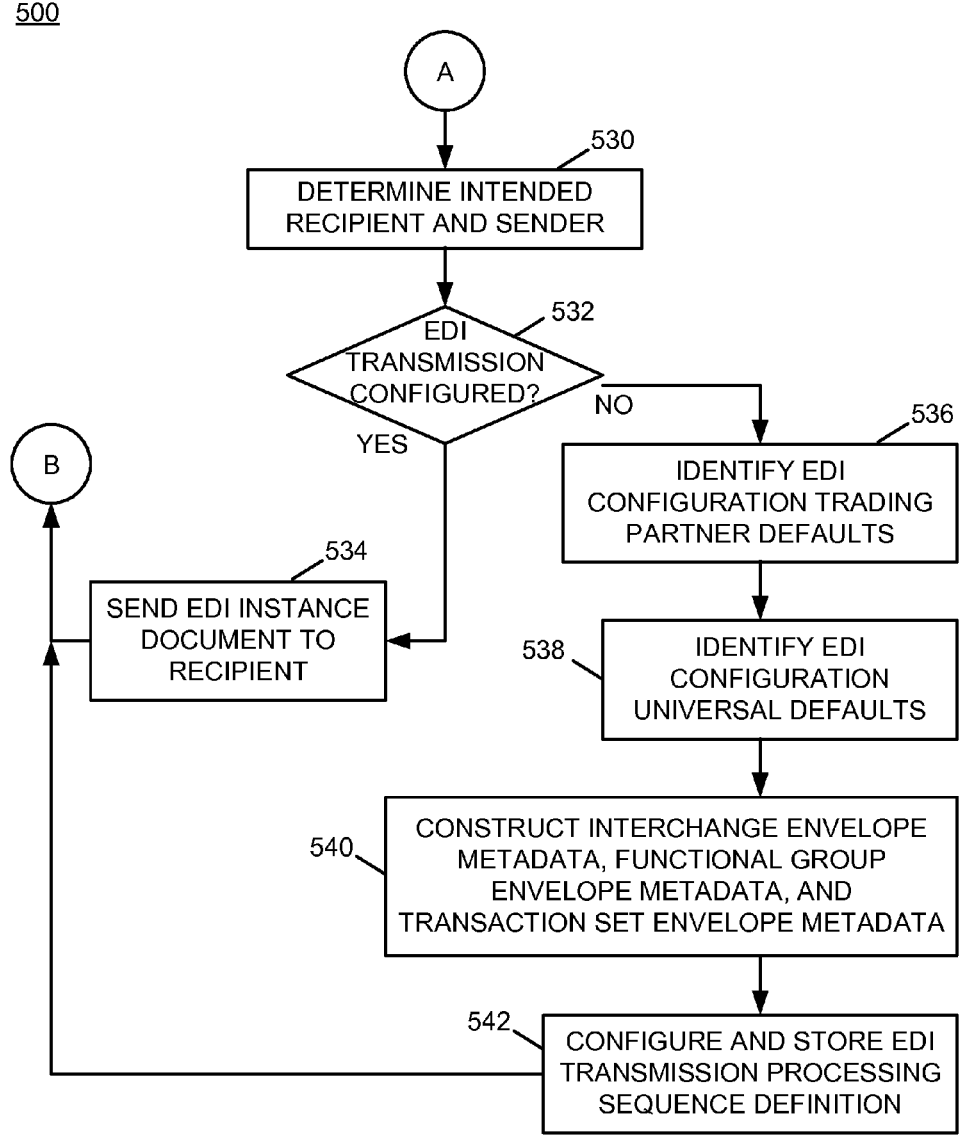
FIG. 5B is a flow chart of an example of an implementation of additional processing within a process for programmatic self-learning of inter-system document processing configurations and runtime processing of EDI documents according to an embodiment of the present subject matter.

FIG. 4 through FIG. 5B described below represent example processes that may be executed by devices, such as the core processing module 200, to perform the automated programmatic self-learning of inter-system document processing configurations associated with the present subject matter. Many other variations on the example processes are possible and all are considered within the scope of the present subject matter. The example processes may be performed by modules, such as the electronic data interchange (EDI) processing rule configuration module 216 and/or executed by the CPU 202, associated with such devices. It should be noted that time out procedures and other error control procedures are not illustrated within the example processes described below for ease of illustration purposes. However, it is understood that all such procedures are considered to be within the scope of the present subject matter. Further, the described processes may be combined, sequences of the processing described may be changed, and additional processing may be added or removed without departure from the scope of the present subject matter.

FIG. 4 is a flow chart of an example of an implementation of a process 400 for programmatic self-learning of inter-system document processing configurations. The process 400 represents a computer-implemented method of configuring and performing the complex document processing actions described herein. At block 402, the process 400 determines, in response to reception of an electronic data interchange (EDI) instance document, that a hierarchical EDI reception processing rule sequence, useable to partition encoded hierarchical envelopes of the EDI instance document and to invoke processing of payload data packaged within the encoded hierarchical envelopes, has not been configured. At block 404, the process 400 determines, by analysis of content of the EDI instance document, an EDI standard and syntax formatting of the encoded hierarchical envelopes that package the payload data within the EDI instance document. At block 406, the process 400 configures an EDI reception processing sequence definition that encodes the hierarchical EDI reception processing rule sequence usable to partition the encoded hierarchical envelopes of the EDI instance document and to invoke the processing of the payload data packaged within the encoded hierarchical envelopes.

FIGS. 5A-5B illustrate a flow chart of an example of an implementation of process 500 for programmatic self-learning of inter-system document processing configurations and runtime processing of EDI documents. The process 500 represents a computer-implemented method of configuring and performing the complex document processing actions described herein. FIG. 5A illustrates initial processing within the process 500. It should be noted that the process 500 as described below is capable of both configuring processing for EDI documents and is capable of processing EDI the documents themselves.

At decision point 502, the process 500 begins higher level processing by determining whether an inbound EDI document has been detected. In response to determining that an inbound document has not been detected, the process 500 makes a determination at decision point 504 as to whether an outbound EDI document has been detected. In response to determining that an outbound EDI document has not been detected, the process 500 returns to decision point 502 and iterates as described above. As such, the process 500 iterates between determining whether one of an inbound or outbound EDI document has been detected.

As described above, an inbound EDI document or an outbound document may be a real instance document or may be a sample design-time document from which reception configuration EDI processing rules and transmission EDI processing rules may be derived and configured. Further, if the process 500 is being used during design time for configuration of EDI processing rules (using either an example document or a real instance document), then a user may be prompted for a direction (e.g., inbound or outbound) for which to configure EDI processing rules, and the response to the prompt may be used to select between an affirmative determination at decision points 502 and 504.

Returning to the description of decision point 502, in response to determining that an inbound EDI document has been detected, the process 500 begins parsing electronic data interchange (EDI) syntax of the inbound EDI document at block 506. At block 508, the process 500 compares the EDI syntax with EDI configuration universal defaults. It should be noted that the description herein with respect to the use of EDI configuration universal defaults presumes that an existing EDI standard was used to encode the EDI envelope information of the inbound EDI document. Where an existing EDI standard was not used to encode the EDI envelope information of the inbound EDI document, additional processing may be performed to determine relationships in the data and to identify wrapper components, such as by text analysis or other processing.

At block 510, the process 500 identifies the EDI standard and syntax formatting. At block 512, the process 500 extracts interchange information, functional group information, and transaction set information from the inbound EDI document. It is understood that the example data positions described above with reference to FIG. 3 may be identified during the parsing and the EDI standard and syntax formatting identification to identify the respective items of information. For example, regarding the extracted interchange information, a sender identifier qualifier, a sender identifier, a receiver identifier qualifier, a receiver identifier, and a syntax version (e.g., ASC X12 version) may be identified. Regarding the extracted functional group information, for each identified set of functional group information a message type, a sending department, a receiving department, and a message identifier (ID) may be identified. Regarding the extracted transaction set information, for each identified transaction a transaction type and transaction identifier (ID) may be identified.

At decision point 514, the process 500 makes a determination as to whether an EDI reception processing sequence definition, including EDI reception rules, for the respective EDI encoding standard has been configured. In response to determining that an EDI reception processing sequence definition, including EDI reception rules, for the respective EDI standard has been configured, the process 500 processes the inbound EDI document using the configured EDI reception processing sequence definition and the associated EDI reception rules at block 516. As described above, processing the inbound EDI document using the configured EDI reception processing sequence definition may include partitioning of the encoded hierarchical envelopes of the EDI instance document and invoking processing of payload data packaged within the encoded hierarchical envelopes. The processing at block 516 may also include validating the EDI instance document, creating a structured outbound acknowledgement, and performing any translations of the EDI instance document or payload as may be appropriate for a given implementation (e.g., translation of the EDI instance document and generation of additional new document(s), etc.). The process 500 returns to decision point 502 and iterates as described above.

Returning to the description of decision point 514, in response to determining that an EDI reception processing sequence definition, including EDI reception rules, for the respective EDI encoding standard has not been configured, the process 500 compares the extracted information (e.g., interchange, functional group, and transaction set information) with EDI configuration trading partner defaults at block 518. At decision point 520, the process 500 makes a determination as to whether any trading partner overrides have been configured for the trading partners within the extracted information. In response to determining that one or more partner overrides have been configured for the trading partners within the extracted information, the process 500 merges the identified trading partner overrides with the extracted information at block 522. For example, if an override exists for an identified element separation syntax, the process 500 may replace the identified element separation syntax with the override element separation syntax. Similar overrides may be performed for an identified repeating element delimiter, sub-element delimiter, segment terminator, syntax version, and other aspects of the identified information.

In response to merging the identified trading partner overrides with the extracted information at block 522, or in response to determining at decision point 520 that no trading partner overrides have been configured for the trading partners within the extracted information, the process 500 constructs interchange envelope metadata, functional group envelope metadata, and transaction set envelope metadata using the extracted and overridden information along with any configuration universal defaults at block 524. The constructed interchange envelope metadata, functional group envelope metadata, and transaction set envelope metadata may be represented in any sharable format, such as an extensible markup language (XML) document represented by an XML schema as one possible example sharable format. For example, the construction of the interchange envelope metadata may be constructed by creating tags and values for syntax options at the interchange level, tags and values for sender and receiver qualifier values, values for sender and receiver identification, tags and values for syntax standards version, and tags and values representing a unique identifier for this envelope level. Similarly, the functional group envelope metadata may be constructed by creating tags and values for a sending department and a receiving department, tags and values for transaction identifiers, tags and values representing a unique identifier for the functional envelope level, and tags and values representing reciprocal links to the interchange (parent) identifier for the functional group envelope level. Additionally, the transaction set envelope metadata may be constructed by creating tags and values for the transaction type, tags and values for the transaction identifier, tags and values representing a unique identifier for the transaction set envelope level, and tags and values representing reciprocal links to the functional group (parent) identifier for the transaction set envelope level.

At block 526, the process 500 configures and stores an EDI reception processing sequence definition, including EDI reception processing rules, and creates and stores a complementary EDI transmission processing sequence definition, including EDI transmission processing rules, to process EDI instance documents exchanged between the trading partners. As described above, configuring the EDI reception processing sequence definition may include configuring processing usable to partition encoded hierarchical envelopes of the EDI instance document and to invoke processing of payload data packaged within the encoded hierarchical envelopes. It should be noted that the processing at block 526 may also include creation of outbound envelopes for wrapping acknowledgements to received inbound instance documents. Additionally, EDI document transformation rules and EDI document validation rules for respectively transforming and validating EDI instance documents may also be configured.

It should be noted that the EDI transmission processing rules complement the reception processing rules. As such, hierarchical sequential processing of an outbound document may be configured as a reverse sequence of identified hierarchical envelope reception processing. As such, the process 500 develops EDI transmission processing rules and an EDI transmission processing sequence definition using the created and stored EDI reception processing sequence definition, including EDI reception processing rules. The process 500 is described in more detail below with respect to FIG. 5B to illustrate derivation of the EDI transmission processing sequence definition, including EDI transmission processing rules, based upon trading partner and universal defaults to further elaborate upon derivation of the EDI transmission counterpart rules from these forms of defaults. While the processing described in association with FIG. 5B is shown and described as an integrated aspect of the process 500, it is understood that either variation of processing to derive the EDI transmission processing rules and the EDI transmission processing sequence definition may be used as appropriate for a given implementation.

Returning to the description of the process 500, at decision point 528, the process 500 makes a determination as to whether the process 500 is currently being used during runtime for runtime configuration of EDI reception processing rules or whether the process 500 is currently being used for design-time configuration of EDI reception processing rules. In response to determining that the process 500 is being used during runtime for runtime configuration of EDI reception processing rules, the process 500 transitions to block 516 and processes the inbound EDI document as described above using the runtime configured EDI reception processing sequence definition, and the process 500 iterates as described above. As also described above, in addition to processing the envelopes and payload of the received EDI instance document, the processing at block 516 may include using the configured EDI reception processing sequence definition and EDI reception processing rules to validate the EDI instance document, create a structured outbound acknowledgement, and perform any translations of the EDI instance document or payload as may be appropriate for a given implementation (e.g., translation of the EDI instance document and generation of additional new document(s), etc.). Alternatively, in response to determining at decision point 528 that the process 500 is currently being used for design-time configuration of EDI reception processing rules, the process 500 transitions back to decision point 502 and iterates as described above.

Returning to the description of decision point 504, in response to determining that an outbound EDI document has been detected, the process 500 transitions to the processing shown and described in association with FIG. 5B.

FIG. 5B illustrates additional processing associated with the process 500 for programmatic self-learning of intersystem document processing configurations and runtime processing of EDI documents. It is understood that the outbound EDI document, whether a sample document or a real instance document, is considered for purposes of example to already be encoded with the particular EDI envelopes for which an EDI transmission processing sequence may be determined. As such, no determination with respect to runtime or design time is illustrated or described in association with the outbound processing. Instead, where the outbound EDI document is received and it is determined that an EDI transmission processing sequence has already been configured, the process 500 sends the EDI document. Otherwise, the process 500 performs processing to configure the appropriate EDI transmission processing sequence, as described in more detail below.

At block 530, the process 500 determines an intended recipient and an intended sender. At decision point 532, the process 500 makes a determination as to whether an EDI transmission processing sequence definition, including EDI transmission rules, for the respective recipient and sender has been configured. In response to determining that the EDI transmission processing sequence definition, including EDI transmission rules, for the respective recipient and sender has been configured, the process 500 sends the EDI instance document to the recipient at block 534, and returns to the processing described in association with FIG. 5A at decision point 502 and iterates as described above.

It is understood that where the EDI transmission processing sequence definition has already been configured for the particular sender and recipient, the process 500 as illustrated presumes the document to be a real instance document to be sent using the configured EDI transmission processing sequence definition. In contrast, where there is no EDI transmission processing sequence definition configured for the particular sender and recipient, the process 500 as illustrated configures an EDI transmission processing sequence definition, and does not make any determination as to whether to send the document. As such, the determination of design time versus runtime may be reduced in complexity for outbound processing.

Returning to the description of decision point 532, in response to determining that an EDI transmission processing sequence definition, including EDI transmission rules, for the respective recipient and sender has not been configured, the process 500 identifies EDI configuration trading partner defaults at block 536. At block 538, the process 500 identifies EDI configuration universal defaults for a particular EDI standard usable by the trading partners.

At block 540, the process 500 constructs interchange envelope metadata, functional group envelope metadata, and transaction set envelope metadata. At block 542, the process 500 configures and stores an EDI transmission processing sequence definition, including EDI transmission processing rules, to process EDI instance documents exchanged between the trading partners. The process 500 returns to the processing described in association with FIG. 5A at decision point 502 and iterates as described above.

As such, the process 500 may perform design-time and runtime configuration of inbound and outbound EDI processing rules and may create EDI reception and EDI transmission processing sequence definitions using the configured inbound and outbound EDI processing rules, respectively. The process 500 may process inbound instance documents and outbound instance documents using the self-configured inbound and outbound EDI processing rules and the self-configured EDI reception and EDI transmission processing sequence definitions, respectively.

As described above in association with FIG. 1 through FIG. 5B, the example systems and processes provide programmatic self-learning of inter-system document processing configurations. Many other variations and additional activities associated with programmatic self-learning of inter-system document processing configurations are possible and all are considered within the scope of the present subject matter.

Those skilled in the art will recognize, upon consideration of the above teachings, that certain of the above examples are based upon use of a programmed processor, such as the CPU 202. However, the invention is not limited to such example embodiments, since other embodiments could be implemented using hardware component equivalents such as special purpose hardware and/or dedicated processors. Similarly, general purpose computers, microprocessor based computers, micro-controllers, optical computers, analog computers, dedicated processors, application specific circuits and/or dedicated hard wired logic may be used to construct alternative equivalent embodiments.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art based upon the teachings herein without departing from the scope and spirit of the invention. The subject matter was described to explain the principles of the invention and the practical application, and to enable others of ordinary skill in the art to understand the invention for various embodiments with various modifications as are suited to the particular use contemplated.

What is claimed is:

1. A computer-implemented method, comprising:
    determining, in response to reception of an electronic data interchange (EDI) instance document, that a hierarchical EDI reception processing rule sequence, useable to partition encoded hierarchical envelopes of the EDI instance document and to invoke processing of payload data packaged within the encoded hierarchical envelopes, has not been configured;
    determining, by analysis of content of the EDI instance document, an EDI standard and syntax formatting of the encoded hierarchical envelopes that package the payload data within the EDI instance document; and
    configuring an EDI reception processing sequence definition that encodes the hierarchical EDI reception processing rule sequence usable to partition the encoded hierarchical envelopes of the EDI instance document and to invoke the processing of the payload data packaged within the encoded hierarchical envelopes.

2. The computer-implemented method of claim 1, where:
    the received EDI instance document comprises a real EDI instance document; and
    configuring the EDI reception processing sequence definition that encodes the hierarchical EDI reception processing rule sequence comprises performing a real-time configuration of the EDI reception processing sequence definition that encodes the hierarchical EDI reception processing rule sequence.

3. The computer-implemented method of claim 2, further comprising partitioning the encoded hierarchical envelopes of the received real EDI instance document and invoking the processing of the payload data packaged within the partitioned encoded hierarchical envelopes in real time using the real-time configured EDI reception processing sequence definition that encodes the hierarchical EDI reception processing rule sequence.

4. The computer-implemented method of claim 1, where the received EDI instance document comprises a sample EDI instance document.

5. The computer-implemented method of claim 1, further comprising configuring, using the configured EDI reception processing sequence definition and the encoded hierarchical EDI reception processing rule sequence, a complementary EDI transmission processing sequence definition that encodes a hierarchical EDI transmission processing rule sequence usable to create encoded hierarchical envelopes that package outgoing data as part of an outgoing EDI instance document.

6. The computer-implemented method of claim 1, where configuring the EDI reception processing sequence definition that encodes the hierarchical EDI reception processing rule sequence comprises configuring a structured EDI outbound acknowledgement rule that generates a structured EDI outbound acknowledgement in response to processing of received EDI instance documents.

7. The computer-implemented method of claim 1, where configuring the EDI reception processing sequence definition that encodes the hierarchical EDI reception processing rule sequence comprises configuring at least one EDI instance document validation rule that validates received EDI instance documents.

8. A system, comprising:
a memory; and
a processor programmed to:
   determine, in response to reception of an electronic data interchange (EDI) instance document, that a hierarchical EDI reception processing rule sequence, useable to partition encoded hierarchical envelopes of the EDI instance document and to invoke processing of payload data packaged within the encoded hierarchical envelopes, has not been configured;
   determine, by analysis of content of the EDI instance document, an EDI standard and syntax formatting of the encoded hierarchical envelopes that package the payload data within the EDI instance document; and
   configure, within the memory, an EDI reception processing sequence definition that encodes the hierarchical EDI reception processing rule sequence usable to partition the encoded hierarchical envelopes of the EDI instance document and to invoke the processing of the payload data packaged within the encoded hierarchical envelopes.

9. The system of claim 8, where:
the received EDI instance document comprises a real EDI instance document;
in being programmed to configure, within the memory, the EDI reception processing sequence definition that encodes the hierarchical EDI reception processing rule sequence, the processor is programmed to perform a real-time configuration of the EDI reception processing sequence definition that encodes the hierarchical EDI reception processing rule sequence; and
the processor is further programmed to partition the encoded hierarchical envelopes of the received real EDI instance document and invoke the processing of the payload data packaged within the partitioned encoded hierarchical envelopes in real time using the real-time configured EDI reception processing sequence definition that encodes the hierarchical EDI reception processing rule sequence.

10. The system of claim 8, where the received EDI instance document comprises a sample EDI instance document.

11. The system of claim 8, where the processor is further programmed to configure, within the memory using the configured EDI reception processing sequence definition and the encoded hierarchical EDI reception processing rule sequence, a complementary EDI transmission processing sequence definition that encodes a hierarchical EDI transmission processing rule sequence usable to create encoded hierarchical envelopes that package outgoing data as part of an outgoing EDI instance document.

12. The system of claim 8, where, in being programmed to configure, within the memory, the EDI reception processing sequence definition that encodes the hierarchical EDI reception processing rule sequence, the processor is programmed to configure, within the memory, a structured EDI outbound acknowledgement rule that generates a structured EDI outbound acknowledgement in response to processing of received EDI instance documents.

13. The system of claim 8, where, in being programmed to configure, within the memory, the EDI reception processing sequence definition that encodes the hierarchical EDI reception processing rule sequence, the processor is programmed to configure at least one EDI instance document validation rule that validates received EDI instance documents.

14. A computer program product, comprising:
a computer readable storage medium having computer readable program code embodied therewith, where the computer readable storage medium is not a transitory signal per se and where the computer readable program code when executed on a computer causes the computer to:
   determine, in response to reception of an electronic data interchange (EDI) instance document, that a hierarchical EDI reception processing rule sequence, useable to partition encoded hierarchical envelopes of the EDI instance document and to invoke processing of payload data packaged within the encoded hierarchical envelopes, has not been configured;
   determine, by analysis of content of the EDI instance document, an EDI standard and syntax formatting of the encoded hierarchical envelopes that package the payload data within the EDI instance document; and
   configure an EDI reception processing sequence definition that encodes the hierarchical EDI reception processing rule sequence usable to partition the encoded hierarchical envelopes of the EDI instance document and to invoke the processing of the payload data packaged within the encoded hierarchical envelopes.

15. The computer program product of claim 14, where:
the received EDI instance document comprises a real EDI instance document; and
in causing the computer to configure the EDI reception processing sequence definition that encodes the hierarchical EDI reception processing rule sequence, the computer readable program code when executed on the computer causes the computer to perform a real-time configuration of the EDI reception processing sequence definition that encodes the hierarchical EDI reception processing rule sequence.

16. The computer program product of claim 15, where the computer readable program code when executed on the computer further causes the computer to partition the encoded hierarchical envelopes of the received real EDI instance document and invoke the processing of the payload data packaged within the partitioned encoded hierarchical envelopes in real time using the real-time configured EDI reception processing sequence definition that encodes the hierarchical EDI reception processing rule sequence.

17. The computer program product of claim 14, where the received EDI instance document comprises a sample EDI instance document.

18. The computer program product of claim 14, where the computer readable program code when executed on the computer further causes the computer to configure, using the configured EDI reception processing sequence definition and the encoded hierarchical EDI reception processing rule sequence, a complementary EDI transmission processing sequence definition that encodes a hierarchical EDI transmission processing rule sequence usable to create encoded hierarchical envelopes that package outgoing data as part of an outgoing EDI instance document.

19. The computer program product of claim 14, where, in causing the computer to configure the EDI reception processing sequence definition that encodes the hierarchical EDI reception processing rule sequence, the computer readable program code when executed on the computer causes the computer to configure a structured EDI outbound acknowledgement rule that generates a structured EDI outbound acknowledgement in response to processing of received EDI instance documents.

20. The computer program product of claim 14, where, in causing the computer to configure the EDI reception processing sequence definition that encodes the hierarchical EDI reception processing rule sequence, the computer readable program code when executed on the computer causes the computer to configure at least one EDI instance document validation rule that validates received EDI instance documents.

* * * * *